Oct. 3, 1961 A. F. JOHNSON, JR 3,003,130
LIQUID RHEOSTAT
Filed July 27, 1960 2 Sheets-Sheet 1

INVENTOR
ANDERSON F. JOHNSON, JR.
BY
John B. Spencer

Oct. 3, 1961  A. F. JOHNSON, JR  3,003,130
LIQUID RHEOSTAT
Filed July 27, 1960  2 Sheets-Sheet 2
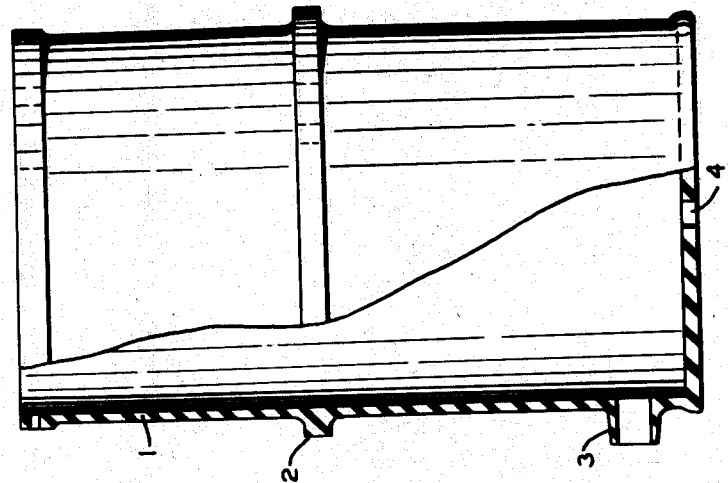
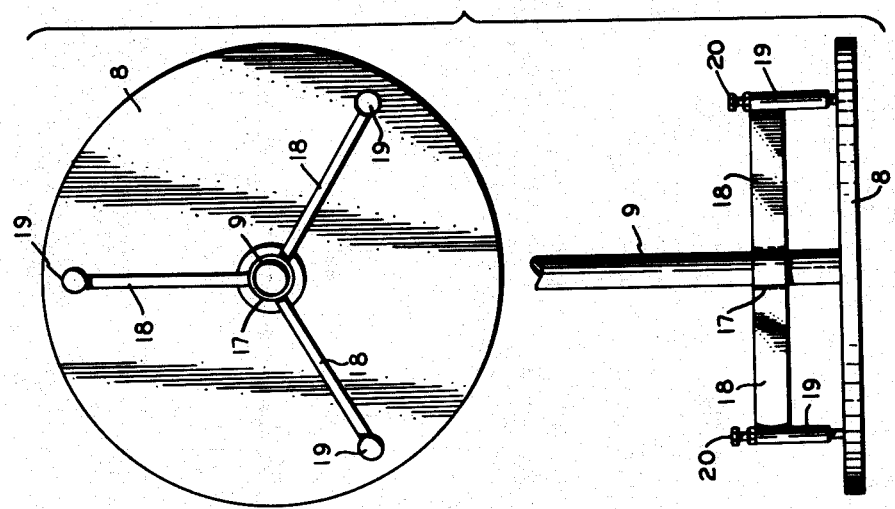
INVENTOR
ANDERSON F. JOHNSON, JR.
BY
John B. Spansler

United States Patent Office 3,003,130
Patented Oct. 3, 1961

3,003,130
LIQUID RHEOSTAT
Anderson F. Johnson, Jr., Salem, Va., assignor to General Electric Company, a corporation of New York
Filed July 27, 1960, Ser. No. 45,735
8 Claims. (Cl. 338—83)

This invention relates to liquid rheostats, and more particularly relates to improved construction of insulation and electrode spacing in liquid rheostats having parallel opposed electrodes.

Conventionally liquid rheostats having one or more sets of fixed and movable electrodes are arranged with each set of electrodes placed within a cell, which is placed inside an electrolyte storage tank or suspended therein by supporting structure. The supporting structure usually consists of various combinations of insulating materials and conductive, metallic supports. Normally these cells are provided with metallic bottom plates which are a part of the active electrical circuit, thereby introducing safety hazards to operating personnel. Suspended cells of prior art construction frequently use a portion of the interior volume of the cell for means of conveyance of cooled electrolyte to the bottom of the cell, and frequently provide undesirable electrolyte leakage due to the multiplicity of gasketed surfaces of dissimilar materials.

Another feature that has been found to be disadvantageous in most conventional liquid rheostats is the mechanism used for obtaining a precisely parallel relationship of the moving and fixed electrodes. Usually this mechanism is inaccessible and cumbersome, thereby making maintenance difficult and construction costly.

This invention is directed to an improved construction for eliminating the above noted deficiencies, and provides a cell construction composed entirely of insulating material and having integral therewith a supporting flange and an external electrolyte port so that the bottom of the cell forms no part of the electrical circuit, the only electrical component external of the bottom of the cell being a connection to one of the electrodes.

It is an object of this invention, therefore, to provide a liquid rheostat of unitary insulating material and support.

A further object of the invention is to provide a gravity seal between the rheostat cell and the electrolyte tank.

Another object of the invention is to provide in a liquid rheostat simple electrode adjustment mechanism for obtaining parallel alignment of the electrodes.

Still another object of the invention is to provide a liquid rheostat construction having external electrolyte ducts rather than internal ducts.

The novel features of the invention are set forth with particularity in the appended claims. The invention itself, however, both as to its organization and method of operation, together with further objects and advantages thereof, may best be understood by referring to the following description and the accompanying drawings.

In the drawings:

FIGURE 2 shows the assembly of the electrode aligning mechanism in both a top view and a side view.

FIGURE 3 is a more detailed view of the cell construction with a portion cut away to show its unitary design and the integral supporting flange.

Figure 1:
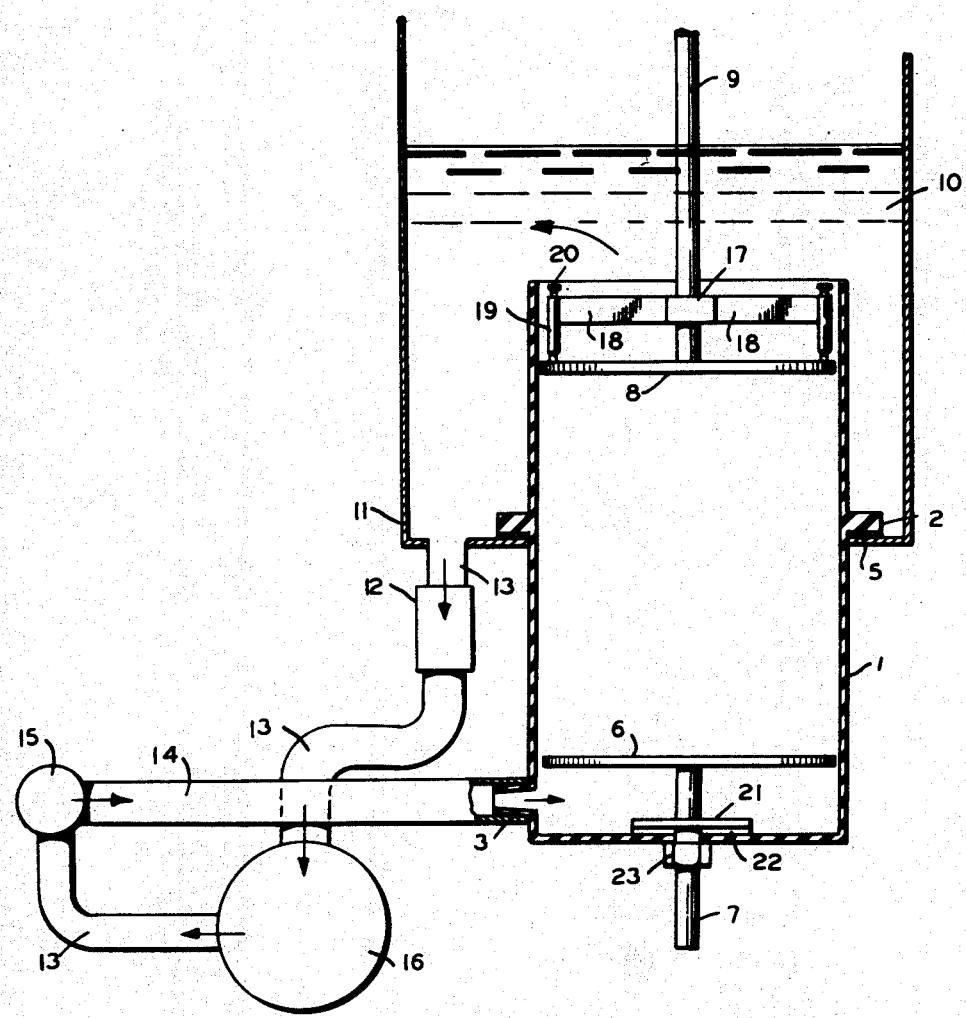
FIGURE 1 is a diagrammatic view of the novel cell and rheostat construction illustrating the manner in which the cell is connected with the electrolyte tank and electrolyte circulating system.

Referring to FIGS. 1 and 3 of the drawings a cell 1 in the form of an open-ended cylinder composed of insulating material is illustrated supported by an integral flange 2 upon the floor of a tank 11 containing electrolyte 10, there being a gasket 5 for effecting a seal between the tank and the cell. A pump 12 is connected by suitable pipes 13 from the tank 11 to a heat exchanger 16 and a header 15 connected via a duct 14 to a return port 3 in the cell 1 thereby forming a cooling path for the electrolyte. Electrolyte 10 is circulated from the bottom of the tank 11 to the bottom of the cell 1 via the aforementioned cooling path. An electrode 6 supported by a stud 7 is mounted to the bottom of the cell 1, being provided with a liquid retaining disc 21, a gasket 22, and a clamping nut 23 threaded to the stud 7. The pipes 13 and the duct 14 are made of insulating material. The electrode 6 may be provided with holes to permit passage of the electrolyte.

At the top of cell 1 the other electrode 8 is supported by a stud 9 (suspended by supporting means not shown). The electrode 8 may also have holes for electrolyte passage. Referring also to FIG. 2 the electrode 8 is provided with an aligning mechanism including a hub 17, three arms 18, and three tapped cylinders 19, one at the end of each arm 18, each of the cylinders 19 being provided with an adjusting bolt 20 bearing upon the upper surface of the electrode 8. The hub 17 is rigidly attached to the rod 9; however, the electrode 8 is also rigidly attached to the rod 9. Adjustment of the bolts 20, therefore, in order to make the lower surface of electrode 8 parallel with the upper surface of electrode 6, causes a deflection of the rod 9 in the portion between the hub 17 and the electrode 8. This arrangement provides a fine adjustment of electrode alignment that is readily accessible from the top of the cell 1.

The level of electrolyte normally is maintained above the top of cell 1 as indicated by the heavy lines shown near the top of the tank 11 in FIG. 1. Consequently the cell 1, being filled with electrolyte, bears upon the flange 2 and the gasket 5 against the floor of the tank 11 with a force proportional to the weight of the electrolyte to provide a gravity seal. When the cell is required to be removed for maintenance purposes, the electrolyte is drained off and the gravity seal is relieved so that the cell may be easily taken from the tank 11. This provides a unique arrangement not found in previous liquid rheostats that reduces the periodic maintenance time required to be performed in such devices.

While this invention has been explained and described with the aid of a particular embodiment thereof, it will be understood that the invention is not limited thereby and that many modifications will occur to those skilled in the art. It is therefore contemplated by the appended claims to cover all such modifications as fall within the scope and spirit of the invention.

What is claimed is:

1. In a liquid rheostat a first container and a second container partially extending through an opening in the said first container and having an integral flange for supporting the second container at its juncture with the first container, electrolyte solution in both containers arranged in a manner so that the weight of said solution bears upon said juncture to effect a gravity seal, means for circulating externally said solution between said containers including a heat exchanger, and a pair of spaced electrodes in the second said container.

2. The invention as set forth in claim 1 wherein the said second container is submerged in the said first container.

3. The invention of claim 2 with the further provision that both containers are of insulating material.

4. The invention according to claim 1 including a connection to one of said electrodes projecting through the extended portion of said second container.

5. The invention of claim 1 with the further provision that the active electrical surfaces of the said electrodes are parallel.

6. The invention set forth in claim 5 wherein means is provided for adjusting one of said electrodes to have its active surface variably spaced from the other said electrode.

7. The invention of claim 5 wherein means is provided to adjust one of said electrodes to have its active surface parallel with the active surface of the other electrode.

8. The invention of claim 5 with the further provision of means to adjust one of said electrodes to have its active surface parallel with the active surface of the other electrode, said means including a tripod support for the adjustable electrode whereby variation of the tripod supporting elements regulates the said parallel relationship.

References Cited in the file of this patent

UNITED STATES PATENTS

| | | |
|---|---|---|
| 1,506,406 | Carver | Aug. 26, 1924 |
| 2,649,526 | Benchemoul | Aug. 18, 1953 |
| 2,735,057 | Schaelchlin | Feb. 14, 1956 |